3,065,265
AMINO ACID HYDRAZIDES
Hugo Gutmann, Birsfelden, Balthasar Hegedüs, Binningen, and Paul Zeller, Neuallschwil, Switzerland, assignors to Hoffman-La Roche Inc., Nutley, N.J., a corporation of New Jersey
No Drawing. Filed June 30, 1958, Ser. No. 745,273
Claims priority, application Switzerland July 4, 1957
9 Claims. (Cl. 260—534)

This invention relates to amino acid hydrazides. More particularly, the invention relates to substituted amino acid hydrazides which are represented by the formula (I)

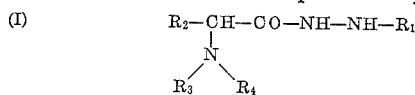

wherein:
$R_1$ represents lower alkyl and phenyl lower alkyl
$R_2$ represents the radical of an α-amino acid
$R_3$ and $R_4$ each represents hydrogen, lower alkyl or acyl
and to salts thereof.

$R_1$ in Formula I represents a straight chain and branched chain lower alkyl group such as methyl, ethyl, propyl, isopropyl, butyl, sec.-butyl, isobutyl, amyl, hexyl, heptyl and the like or such groups with a phenyl radical attached.

$R_2$ represents the residue of an α-amino acid, i.e. the radical attached to the α-carbon atom in the characteristic α-amino acetic acid moiety

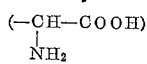

of the α-amino acid. Preferably, these are radicals of α-amino acids having up to about 16 atoms in the skeleton, that is α-amino acids, containing about 16 carbon, nitrogen, oxygen or sulfur atoms exclusive of all hydrogen atoms in the molecule.

α-Amino acids which are the sources of compounds of this invention include, for example, methionine, serine, alanine, phenylalanine, tyrosine, tryptophan, threonine, glycine, leucine, isoleucine, glutamine, glutamic acid, asparagine, aspartic acid, arginine, citrulline, cysteine, cystine, histidine, lysine, norleucine, norvaline, ornithine, sarcosine and valine. The optically active acids as well as the racemic acids, or the derivatives thereof, may be used as starting materials. The optical configuration of the starting material remains unchanged during the process of synthesizing the novel hydrazides.

In addition, the α-amino group may be alkylated or acylated as indicated in Formula I when $R_3$ and $R_4$ represent lower alkyl or acyl. Lower alkyl groups represented by $R_3$ and $R_4$ include straight chain and branched chain groups such as those illustrated above. The acyl groups include the lower alkanoyl radicals derived from lower fatty acids, e.g. acetyl, propionyl, butyryl and the like. Other suitable acyl groups are, for example, radicals of monocarboxylic acids which may be eliminated by treatment with alkaline solutions, such as the trifluoroacetyl radical. A further group of suitable acyl radicals are those which may be eliminated by hydrogenolysis, for example carbobenzoxy, or by treatment with hydrogen bromide in glacial acetic acid, for example carbocyclohexyloxy and carboallyloxy.

Especially preferred end products are those in which $R_1$ represents the isopropyl, sec.-butyl, benzyl or phenethyl radical.

The compounds of Formula I may be synthesized by several methods. The preferred method, which constitutes a particular feature of this invention, comprises condensing an α-amino acid or substituted α-amino acid corresponding to the formula (II)

with a substituted hydrazine corresponding to the formula (III) $\qquad H_2N-NH-R_1$ in the presence of an N,N'-disubstituted carbodiimide. $R_1$, $R_2$, $R_3$ and $R_4$ in Formulae II and III have the same significance as in Formula I. The condensation product, when $R_3$ and/or $R_4$ represent an acyl group, may then be deacylated by treating with alkali, with hydrogen bromide in glacial acetic acid or by hydrogenolysis. This process is especially suitable when α-acylamino acids are used as starting materials. The acids may be used as such; transforming them into more reactive compounds, such as their esters, halides, amides, anhydrides and the like, is unnecessary.

Any carbodiimide may be used for the condensation reaction, since the groups attached to the carbodiimide radical do not interfere with the principal reaction. Illustrative groups which may be attached to the carbodiimide radical include lower alkyl groups, such as methyl, ethyl, propyl and the like, cycloalkyl groups such as cyclohexyl and the like, and aromatic groups such as tolyl, benzyl and the like. N,N'-dicyclohexyl-carbodiimide is preferred. Such carbodiimides may be produced by treating a disubstituted urea with p-toluenesulfonyl chloride in pyridine. During the reaction of the α-amino acid with the hydrazine compound, the carbodiimide is converted to a urea derivative from which the reaction product is readily separated.

The reaction of α-amino acid and hydrazine compound may be carried out at room temperature or at a temperature slightly above room temperature. A solvent may be used. Water or organic solvents such as methylene chloride, chloroform, dioxan, tetrahydrofuran, dimethylformamide or acetonitrile are suitable. The amino acid, hydrazine compound and carbodiimide are used in approximately equimolecular proportions.

The compounds of this invention may also be produced by reacting an α-amino acid hydrazide with a carbonyl compound, e.g. an aldehyde or ketone, and simultaneously or successively hydrogenating the hydrazone formed. Other unsaturated bonds which are present in the hydrazone may also be reduced in this reaction step. The hydrogenation is preferably carried out in the presence of a catalyst such as platinum oxide, palladium on charcoal or the like. Alternatively, the hydrogenation may be effected by treatment with lithium aluminum hydride or the like. If $R_3$ or $R_4$ represents a group which may be split off by hydrogenolysis, e.g. the carbobenzoxy group, such group is eliminated in the hydrogenation step. Another alternative comprises treating the hydrazone with a Grignard compound and hydrolyzing the reaction product.

Still another method of producing the compounds of this invention comprises condensing a reactive derivative of the amino acid, e.g. the ester, halide, amide or anhydride, with a substituted hydrazine or a salt thereof. Preferably, the condensation is effected under reflux conditions.

The substituted α-amino acid hydrazides obtained according to this invention form salts with inorganic or organic acids. Such salts include, for example, the hydrohalides, such as hydrochloride, hydrobromide, hydroiodide, other mineral acid salts such as sulfate, phosphate, and nitrate, and salts of organic acids such as tartrate, citrate, camphorsulfonate, ethane-sulfonate, salicylate, ascorbate, maleate, mandelate and the like. Preferred salts are the hydrohalides, especially the hydrochloride. The acid addition salts are prepared by reacting the hydrazine derivatives with the appropriate acid, preferably in an inert solvent with the calculated amount of the acid.

The compounds of this invention are monoamine oxidase inhibitors, that is, they inhibit the activity of monoamine oxidase which effects the deactivation of physiological regulators such as serotonin, tryptamine, epinephrine, etc., and stimulate the central nervous system. They are also useful for increasing weight in cases where cachexia is present. The free hydrazine compound or an addition salt thereof with a medicinally acceptable acid may be administered orally or parenterally in conventional solid or liquid dosage forms such as tablets, capsules, injectables, etc., comprising therapeutic doses incorporated in a conventional solid or liquid vehicle with or without excipients.

The following examples are illustrative of the invention. All temperatures are stated in degrees centigrade.

*Example 1*

22 g. of N-acetyl-DL-methionine ethyl ester were refluxed for 12–14 hours together with 11.05 g. of isopropylhydrazine hydrochloride and 14.1 cc. of triethylamine in 100 cc. of alcohol. The mixture was concentrated in vacuo, the residue diluted with 200 cc. of tetrahydrofuran and the triethylamine hydrochloride that separated was filtered off. The filtrate was concentrated in vacuo and the residue recrystallized from acetonitrile. The 1-(N-acetyl-DL-methionyl)-2-isopropylhydrazine thus obtained melted at 121–123°. It was very readily soluble in water and the resulting solution was neutral against litmus.

*Example 2*

22 g. of N-acetyl-DL-methionine ethyl ester were refluxed for 12–14 hours with 7.4 g. of isopropylhydrazine in 100 cc. of alcohol. The mixture was concentrated in vacuo and the residue recrystallized from acetonitrile. The product thus obtained was identical with the one obtained in Example 1.

*Example 3*

24 g. of N-carbobenzoxy-DL-serine methyl ester were refluxed for 12–14 hours with 7.4 g. of isopropylhydrazine in 100 cc. of alcohol. The mixture was concentrated in vacuo and the residue recrystallized from acetonitrile. The 1-(N-carbobenzoxy-DL-seryl)-2-isopropyl-hydrazine thus obtained melted at 152–154°.

23 g. of the 1-(N-carbobenzoxy-DL-seryl)-2-isopropyl-hydrazine were dissolved in a mixture of 20 cc. of concentrated hydrochloric acid and 200 cc. of water, and hydrogenated in the presence of palladium-on-charcoal. Once the take-up of hydrogen had subsided, the catalyst was filtered off under suction, the filtrate diluted with water to 3000 cc. and filtered through a polystyrene quaternary amine anion exchange column (Amberlite IRA-400). The column was rinsed with water until the pH was brought to about 7. The filtrate was concentrated to dryness in vacuo and the residue recrystallized from acetonitrile. The 1-DL-seryl-2-isopropyl-hydrazine melted at 89–90°. The substance was very readily soluble in water with alkaline reaction (pH=8.9–9.2).

*Example 4*

24 g. of N-acetyl-L(+)-α-alanine-hydrazide were dissolved in 250 cc. of water and 20 cc. of acetone and hydrogenated in the presence of 0.5 g. of platinum oxide. Once the take-up of hydrogen had subsided, the catalyst was filtered off, the filtrate was concentrated in vacuo and the residue recrystallized from acetonitrile. The 1-[N-acetyl-L(+)-α-alanyl]-2-isopropyl-hydrazine thus obtained melted at 147–148°; $[\alpha]_D = -77°$ (c.=1 in water).

By proceeding according to the method disclosed in this example and starting from 24 g. of N-acetyl-D(−)-α-alanine-hydrazide, there was obtained 1-[N-acetyl-D(−)-α-alanyl]-2-isopropyl-hydrazine, M.P. 148–150°, $[\alpha]_D = +74°$ (c.=1 in water); starting from 24 g. of N-acetyl-DL-α-alanine-hydrazide, there was obtained 1-(N-acetyl-DL-α-alanyl)-2-isopropyl-hydrazine, M.P. 128–130°; starting from 22.1 g. of N-acetyl-DL-β-phenyl-alanine-hydrazide, there was obtained 1-(N-acetyl-DL-β-phenyl-alanyl)-2-isopropyl-hydrazine, M.P. 173–174°; starting from 100 g. of sarcosine-hydrazide (obtained from sarcosine methyl ester and a methanolic solution of hydrazine hydrate, B.P. 110°/0.5 mm.; M.P. about 36°), there was obtained 1-sarcosyl-2-isopropyl-hydrazine, M.P. 73–75°.

*Example 5*

47 g. of N-carbobenzoxy-L(−) tyrosine-hydrazide were dissolved in a mixture of 30 cc. of concentrated hydrochloric acid, 300 cc. of absolute alcohol and 400 cc. of water, and hydrogenated in the presence of palladium-on-charcoal. Once the take-up of hydrogen had subsided, the catalyst was filtered off under suction, the filtrate was concentrated and dissolved in a little water. The solution thus obtained was adjusted to pH 5 by means of diethylamine and again evaporated to dryness. After recrystallization from alcohol, there was obtained L(−)-tyrosine-hydrazide monohydrochloride melting at 205–207°, $[\alpha]_D = +83°$ (c.=1 in water).

31 g. of L(−)-tyrosine-hydrazide monohydrochloride were dissolved in 500 cc. of water and 12.6 cc. of acetone, and hydrogenated in the presence of 1.0 g. of platinum oxide. Once the take-up of hydrogen had subsided, the catalyst was filtered off under suction and the solution was filtered through a polystyrene quaternary amine anion exchange column (Amberlite IRA–410). The filtrate was adjused to pH 3.5 by means of sulfuric acid, then concentrated to dryness and the residue was recrystallized from acetone. The 1-L(−)-tyrosyl-2-isopropyl-hydrazine sulfate pentahydrate thus obtained melted at 145–150°, $[\alpha]_D = +38.3°$ (c.=1 in water).

12 g. of L(−)-tyrosine-hydrazide hydrochloride were dissolved in 6 g. of hydrocinnamaldehyde, 100 cc. of water and 50 cc. of alcohol, and hydrogenated in the presence of 0.5 g. of platinum oxide. The resulting solution was adjusted to pH 8 by the addition of sodium hydroxide solution. The oily residue thereby formed, comprising 1-L(−)-tyrosyl-2-(γ-phenylpropyl)-hydrazine, was dissolved in ethyl acetate and recrystallized from acetonitrile, M.P. 141–143°, $[\alpha]_D = +48.8°$ (c.=1 in N hydrochloric acid).

*Example 6*

23 g. of DL-serine-hydrazide hydrochloride (obtained by hydrogenolysis of N-carbobenzoxy-DL-serine-hydrazide in water in the presence of 1 mol of hydrochloric acid; M.P. 187–189°) were dissolved in 150 cc. of water and, after addition of 16 cc. of benzaldehyde, hydrogenated to saturation in the presence of 0.5 g. of platinum oxide. Then, the catalyst was filtered off, the mixture was concentrated to dryness and the residue recrystallized from alcohol. The 1-DL-seryl-2-benzyl-hydrazine hydrochloride thus obtained melted at 195–198°.

15.5 g. of DL-serine-hydrazide hydrochloride were reacted in the same manner as described above with 6.5 g. of acetaldehyde, the reaction product was filtered through an anion exchange column (Amberlite IRA–400) and the filtrate adjusted to pH 4 by means of sulfuric acid. There was thus obtained 1-DL-seryl-2-ethyl-hydrazine sulfate, M.P. 150–152°.

8.7 g. of propionaldehyde were used instead of acetaldehyde in the procedure described above to obtain 1-DL-seryl-2-propyl-hydrazine hydrochloride, M.P. 160–161° (after recrystallization from alcohol/ether).

10.6 g. of butyraldehyde were used instead of acetaldehyde in the procedure described above to obtain 1-DLseryl-2-n-butyl-hydrazine hydrochloride, M.P. 150–152° (after recrystallization from alcohol/ether).

9.3 g. of valeraldehyde were used instead of acetaldehyde in the procedure described above to obtain 1-DL-seryl-2-n-amyl-hydrazine hydrochloride, M.P. 131–134° (after recrystallization from alcohol/ether).

10.8 g. of caproaldehyde were used instead of acetaldehyde in the procedure described above to obtain 1-DL-seryl-2-n-hexyl-hydrazine hydrochloride, M.P. 130–132° (after recrystallization from alcohol/ether).

12.4 g. of enanthaldehyde were used instead of acetaldehyde in the procedure described above to obtain 1-DL-seryl-2-n-heptyl-hydrazine hydrochloride, M.P. 121–123° (after recrystallization from alcohol/ether).

14.5 g. of phenyl acetone were used instead of acetaldehyde in the procedure described above to obtain 1-DL-seryl-2-(α-benzylethyl)-hydrazine hydrochloride, M.P. 80–85°.

Example 7

24 g. of N-carbobenzoxy-DL-serine were dissolved in 200 cc. of tetrahydrofuran and treated with 14.1 cc. of triethylamine. 11.05 g. of isopropylhydrazine hydrochloride were added thereto, the mixture was stirred for 20 minutes and the triethylamine hydrochloride that separated was filtered off under suction. 20.6 g. of N,N'-dicyclohexyl-carbodiimide, mixed with 50 cc. of tetrahydrofuran were added dropwise to the clear filtrate while cooling with ice and stirring. After 2 hours' standing, the contents of the reaction vessel, which solidified to form a crystalline mass, was filtered off under suction and digested with 300 cc. of 3 N hydrochloric acid. Thereupon, the reaction product went into solution, whereas the dicyclohexyl-urea remained as a residue. The mixture was filtered and the filtrate was brought to pH 6–7 by means of sodium hydroxide solution. The crystalline mass that separated was filtered under suction and recrystallized from acetonitrile. The 1-(N-carbobenzoxy-DL-seryl)-2-isopropyl-hydrazine melted at 152–154°.

The 1-(N-carbobenzoxy-DL-seryl)-2-isopropyl - hydrazine was hydrogenolyzed as described in Example 3 to obtain 1-DL-seryl-2-isopropyl-hydrazine, M.P. 89–90°.

7.4 g. of isopropylhydrazine were used instead of triethylamine and isopropylhydrazine hydrochloride in the procedure described above, and 250 cc. of acetonitrile were added to dissolve the N,N'-dicyclohexyl-carbodiimide. There was also obtained by this method 1-(N-carbobenzoxy-DL-seryl)-2-isopropyl-hydrazine, M.P. 152–154°.

In an analogous manner and starting from 18 g. of N-carbo-benzoxy-DL-serine and 6.7 g. of sec. butyl-hydrazine, there was obtained 1-(N-carbobenzoxy-DL-seryl)-2-sec. butyl-hydrazine, M.P. 133°–134° (after recrystallization from alcohol) and, after hydrogenolysis, 1-DL-seryl-2-sec.-butyl-hydrazine, M.P. 93–94°; starting from N-carbobenzoxy-D(+)-serine, there was obtained 1-[N-carbobenzoxy-D(+)-seryl]-2-isopropyl - hydrazine, M.P. 162°–163°, [α]$_D$=+19.1° (c.=1 in N hydrochloric acid) and, after hydrogenolysis, 1-D(+)-seryl-2-isopropyl-hydrazine, M.P. 105–106°, [α]$_D$=−6.1° (c.=1 in water); starting from N-carbobenzoxy-L(−)-serine, there was obtained 1 - [N-carbobenzoxy-L(−)-seryl]-2-isopropyl-hydrazine, M.P. 162°–163°, [α]$_D$= −19.2° (c.=1 in N hydrochloric acid) and, after hydrogenolysis, 1-L(−)-seryl-2-isopropyl-hydrazine, M.P. 105–106°, [α]$_D$= + 8.1 (c. =1 in water); starting from N-carbobenzoxy-DL-serine and methyl hydrazine, there was obtained 1-(N-carbobenzoxy-DL-seryl)-2-methyl-hydrazine, M.P. 185–186°, and, after hydrogenolysis, 1-DL-seryl-2-methylhydrazine, M.P. 94–97°.

Example 8

19.1 g. of N-acetyl-DL-methionine were suspended in 200 cc. of methylene chloride and 14.1 cc. of triethylamine were added. Complete dissolution occurred. 11.05 g. of isopropylhydrazine hydrochloride were added thereto and 20.6 g. of N,N'-dicyclohexyl-carbodiimide were introduced dropwise, while cooling with ice and stirring. After 2 hours, the dicyclohexyl-urea was filtered off, the filtrate was concentrated in vacuo and the residue was triturated with 200 cc. of tetrahydrofuran, whereby triethylamine hydrochloride remained undissolved. The mixture was filtered and the filtrate concentrated in vacuo, the residue was dissolved in 200 cc. of water, a small amount of undissolved material was filtered off, the filtrate was again concentrated in vacuo and the residue recrystallized from acetonitrile. The 1-(N-acetyl-DL-methionyl)-2-isopropyl-hydrazine thus obtained was identical with that obtained according to Examples 1 and 2 and melted at 121–123°.

8.8 g. of sec.-butylhydrazine were substituted for the isopropylhydrazine hydrochloride and the triethylamine in the procedure described above to obtain 1-(N-acetyl-DL-methionyl)-2-sec.butyl-hydrazine, M.P. 109–110°.

Example 9

34 g. of N(α) - carbobenzoxy-DL-tryptophan were added to 14.1 cc. of triethylamine in 300 cc. of tetrahydrofuran and 11.05 g. of isopropylhydrazine hydrochloride. After 10 minutes, the triethylamine hydrochloride was filtered off and, while cooling with ice and stirring, 20.6 g. of N,N'-dicyclohexyl-carbodiimide, diluted with a small amount of tetrahydrofuran, were added dropwise to the filtrate. After 2 hours, the thick crystalline mass was filtered off and washed with a small amount of tetrahydrofuran. The material obtained was triturated with 200 cc. of dimethyl-formamide and the undissolved dicyclohexyl-urea was filtered off, whereupon the filtrate was concentrated in vacuo and the residue triturated with ethyl acetate. The material obtained was purified by recrystallization from 200 cc. of dioxane. The 1-[N(α)-carbobenzoxy-DL-tryptophyl]-2 - isopropyl - hydrazine thus obtained melted at 183–184°.

The 1-[N(α)-carbobenzoxy-DL-tryptophyl]-2 - isopropyl-hydrazine was hydrogenolyzed according to the procedure in Example 3 to obtain 1-DL-tryptophyl-2-isopropyl hydrazine.

In an analogous manner and starting from 28 g. of N(α)-acetyl-DL-tryptophan, there was obtained 1-[N(α)-acetyl-DL-tryptophyl]-2-isopropyl-hydrazine melting at 190–191°.

When 8.8 g. of sec.butylhydrazine were substituted for the isopropylhydrazine hydrochloride and the triethylamine, there was obtained in an analogous manner 1-[N(α)-carbobenzoxy-DL-tryptophyl]-2-sec.butyl - hydrazine melting at 182–183°.

The 1-[N(α)-carbobenzoxy-DL-tryptophyl]-2 - sec.butyl-hydrazine was hydrogenolyzed according to the procedure in Example 3 to obtain 1-DL-tryptophyl-2-sec.-butyl-hydrazine.

Example 10

14.7 g. of N-acetyl-DL-serine were stirred with 200 cc. of acetonitrile and added with 14.1 cc. of triethylamine. 11.05 g. of isopropylhydrazine hydrochloride were added to the clear solution and, while cooling with ice and stirring, 20.6 g. of N,N'-dicyclohexyl-carbodiimide in a small amount of acetonitrile were added dropwise to the mixture obtained. In an exothermic reaction, the condensation product and the dicyclohexyl-urea separated, while triethylamine hydrochloride remained in solution. After 2 hours, the solids were filtered off, washed with acetonitrile and digested with 200 cc. of water. The undissolved dicyclohexyl-urea was filtered off, the filtrate was concentrated in vacuo and the residue recrystallized from alcohol. The 1-(N-acetyl-DL-seryl)-2-isopropyl-hydrazine thus obtained melted at 170–171°.

In an analogous manner and starting from 16.1 g. of N-acetyl-DL-allo-threonine (obtained by acetylation of DL-allo-threonine with acetic anhydride in the presence of magnesium oxide; M.P. 127–129°, after recrystallization from acetonitrile) there was obtained 1-(N-acetyl-DLallo-threonyl)-2-isopropyl-hydrazine melting at 214–216°; starting from 16.1 g. of N-acetyl-DL-threonine (obtained by acetylation of DL-threonine with acetic anhydride in the presence of magnesium oxide, M.P. 127–128°, after recrystallization from acetone) there was obtained 1-(N-acetyl-DL-threonyl) - 2 - isopropyl - hydrazine melting at 174–175°.

*Example 11*

25.3 g. of N-carbobenzoxy-DL-allo-threonine (obtained by carbobenzoxylation of DL-allo-threonine in the presence of magnesium oxide; M.P. 124°, after recrystallization from carbon tetrachloride) were treated according to the method described in Example 10. The mixture of the reaction product and the dicyclohexyl-urea was treated with 300 cc. of 3 N hydrochloric acid and filtered, whereupon the pH of the filtrate was brought to 6–7 by means of sodiumhydroxide solution. By recrystallization from dioxan, there was obtained 1-(N-carbobenzoxy-DL-allo-threonyl)-2-isopropyl-hydrazine melting at 190–191°.

The 1-(N-carbobenzoxy-DL-allo-threonyl)-2-isopropyl-hydrazine was hydrogenolyzed according to the procedure of Example 3 to obtain 1-DL-allo-threonyl-2-isopropyl-hydrazine melting at 103–104° (after recrystallization from acetonitrile).

In an analogous manner and starting from 25.3 g. of N-carbobenzoxy-DL-threonine, there was obtained, after recrystallization from acetonitrile, 1-(N-carbobenzoxy-DL-threonyl)-2-isopropyl-hydrazine melting at 134–136°, and, after hydrogenolysis according to the procedure of Example 3, 1-DL-threonyl-2-isopropyl-hydrazine melting at 84–85° (after recrystallization from acetonitrile).

*Example 12*

42 g. of N-carbobenzoxy-glycine and 14.8 g. of isopropyl-hydrazine were dissolved in 300 cc. of acetonitrile and, while cooling with ice and stirring, 41.2 g. of N,N'-dicyclohexyl-carbodiimide in a small amount of acetonitrile were added dropwise to this solution. The mixture was stirred for 3 hours, whereupon the undissolved dicyclohexyl-urea was filtered off, the filtrate was concentrated to dryness in vacuo and the residue recrystallized from carbon tetrachloride. The 1-(N-carbobenzoxy-glycyl)-2-isopropyl-hydrazine thus obtained melted at 80–81°.

Hydrogenolysis of the 1-(N-carbobenzoxy-glycyl)-2-isopropyl-hydrazine according to Example 3 gave 1-glycyl-2-isopropyl-hydrazine melting at 94–95° (after recrystallization from acetonitrile).

*Example 13*

26 g. of N-trifluoroacetyl-DL-methionine were dissolved in 300 cc. of acetonitrile and 8.4 g. of isopropylhydrazine were added. 23 g. of N,N'-dicyclohexyl-carbodiimide in a small amount of acetonitrile were added dropwise to this mixture, while cooling with ice and stirring. The mixture was then stirred for 2 more hours at room temperature, the undissolved dicyclohexyl-urea was filtered off and the filtrate was concentrated in vacuo. The residue was recrystallized from toluene. The 1-(N-trifluoroacetyl-DL-methionyl)-2-isopropyl-hydrazine thus obtained melted at 111–112°.

12 g. of 1 - (N-trifluoroacetyl-DL-methionyl) - 2 - isopropyl-hydrazine were stirred for 14–16 hours with a mixture of 100 cc. of water and 100 cc. of concentrated ammonia. A small amount of undissolved material was filtered off, the filtrate was concentrated in vacuo to a great extent, the residue was diluted with water to about 1000 cc. and filtered through an Amberlite column (IRA-400). The filtrate was concentrated in vacuo and the residue recrystallized from toluene. The 1 - DL-methionyl - 2 - isopropyl-hydrazine thus obtained melted at 49–51°.

*Example 14*

33.3 g. of N-carbobenzoxy-L(+)-alanine and 22 cc. of triethylamine were dissolved in 300 cc. of methylene chloride, and 16.1 g. of isopropylhydrazine hydrochloride were added thereto. Then, 31 g. of N,N'-dicyclohexyl-carbodiimide in a small amount of methylene chloride were added dropwise to this mixture, while stirring. After 2 hours, the undissolved N,N'-dicyclohexyl-urea was filtered off, and the filtrate was shaken twice with 200 cc. of 3 N hydrochloric acid. The hydrochloric acid solution was washed with ether, the ether was distilled off in vacuo and the reaction product was precipitated by adjusting the pH of the solution to 5–6 by means of sodium hydroxide solution. After recrystallization from toluene, the 1-[N-carbobenzoxy-L(+)-alanyl]-2-isopropyl-hydrazine thus obtained melted at 126–127°; $[\alpha]_D = -25°$ (c.=1 in N hydrochloric acid).

By the hydrogenolysis of 1-[N-carbobenzoxy-L(+)-alanyl]-2-isopropyl-hydrazine according to Example 3, there was obtained 1-L(+)-alanyl-2-isopropyl-hydrazine, the hydrochloride of which melted at 204–205° (after recrystallization from alcohol), $[\alpha]_D = +6°$ (c.=1 in water).

In an analogous manner and starting from N-carbobenzoxy-L-leucine, there was obtained 1-(N-carbobenzoxy-L-leucyl)-2-isopropyl-hydrazine melting at 106–108° (after recrystallization from petroleum ether);

$$[\alpha]_D = +26°$$

(c.=0.66 in N hydrochloric acid) and, after hydrogenolysis, 1-L-leucyl-2-isopropyl-hydrazine melting at 42°, $[\alpha]_D = +17°$ (C.=1 in water); melting point of the monohydrochloride 163–165°; starting from N-carbobenzoxy-L-isoleucine, there was obtained 1-(N-carbobenzoxy-L-isoleucyl) - 2 - isopropyl-hydrazine melting at 169–171° (after recrystallization from alcohol); $[\alpha]_D = -9°$ (c.=1 in N hydrochloric acid) and, after hydrogenolysis, 1-L-isoleucyl-2-isopropyl-hydrazine melting at 60–61° (after recrystallization from petroleum ether); $[\alpha]_D = +19.5°$ (c.=1 in water).

*Example 15*

30 g. of N-carbobenzoxy-β-phenyl-DL-alanine and 14.1 cc. of triethylamine were dissolved in 250 cc. of methylene chloride, and 11.05 g. of isopropylhydrazine hydrochloride were added thereto. Then, 20.6 g. of N,N'-dicyclohexyl-carbodiimide in a small amount of methylene chloride were added dropwise to this mixture, while stirring. Stirring was continued for 2 more hours and the thick precipitated mass, which consisted of N,N'-dicyclohexyl-urea and the reaction product, was filtered off. This material was treated with 300 cc. of dimethylformamide, the undissolved N,N'-dicyclohexyl-urea was filtered off, the filtrate was concentrated in vacuo and the residue recrystallized from isopropanol. The 1-(N-carbobenzoxy-β-phenyl-DL-alanyl)-2-isopropyl-hydrazine melted at 158–159°.

Hydrogenolysis of 1-(N-carbobenzoxy-β - phenyl - DL-alanyl)-2-isopropyl-hydrazine according to Example 3 gave 1-(β-phenyl-DL-alanyl)-2 - isopropyl - hydrazine, the hydrochloride of which melted at 187–188°.

In an analogous manner and starting from N-carbobenzoxy-β-phenyl-L-alanine, there was obtained 1-(N-carbobenzoxy-β-phenyl-L-alanyl)-2-isopropyl-hydrazine melting at 172–174° and, after hydrogenolysis according to Example 3, 1-(β-phenyl-L-alanyl)-2-isopropyl-hydrazine melting at 54–55°, $[\alpha]_D = +49.5°$ (c.=1 in water). The monohydrochloride of this product melted at 168–170°; $[\alpha]_D = +55.5°$ (c.=1 in water).

*Example 16*

21 g. of the γ-benzyl ester of N-carbobenzoxy-L(+)-glutamic acid (J. Chem. Soc., 1950, 3245) and 8.4 cc. of triethylamine were dissolved in 300 cc. of methylene chloride. 6.4 g. of isopropyl-hydrazine hydrochloride were added to this solution and, while stirring, 12.6 g. of N,N'-dicyclohexyl-carbodiimide in a small amount of methylene chloride were added dropwise to the mixture obtained. After 2 hours, the undissolved N,N'-dicyclohexyl-urea was filtered off, the filtrate concentrated in vacuo and the residue distributed between water and ethyl acetate. The dried ethyl acetate solution gave the γ-benzyl ester of 1-(N-carbobenzoxy-L(+)-α-glutamyl)-2 - isopropyl - hydrazine melting at 123–125° (after recrystallization from acetonitrile); [α]$_D^{40}$=—14.8° (c.=1 in N hydrochloric acid).

Hydrogenolysis in alcohol/water according to the procedure of Example 3 gave 1-[L(+)-α-glutamyl]-2-isopropyl-hydrazine melting at 172–173°, [α]$_D$=+31° (c.=1 in water).

*Example 17*

31.3 g. of N-carbobenzoxy-β-phenyl - DL - threo-serine melting at 95–97° (obtained by treating β-phenyl-DL-threo-serine with carbobenzoxychloride in an alkaline solution of sodium hydroxide) and 14.1 cc. of triethylamine were dissolved in 250 cc. of dimethylformamide. 11.05 g. of isopropylhydrazine hydrochloride were added thereto and, while stirring, 20.6 g. of N,N′-dicyclohexyl-carbodiimide in a small amount of dimethylformamide were added dropwise to the mixture thus obtained.

Stirring was continued for 2–3 hours, whereupon the undissolved N,N′-dicyclohexyl-urea was filtered off and the filtrate concentrated to dryness in vacuo. The 1-(N-carbobenzoxy-β-phenyl-DL-threo-seryl)-2-isopropyl - hydrazine thus obtained melted at 157–158° (after recrystallization from acetonitrile).

Hydrogenolysis according to Example 3 gave 1-(β-phenyl-DL-threo-seryl)-2-isopropyl-hydrazine, the hydrochloride of which melted at 188–189°.

*Example 18*

28 g. of N-carbobenzoxy-L(+)-glutamine and 14.1 cc. of triethylamine were dissolved in 300 cc. of methylene chloride, together with 11.05 g. of isopropylhydrazine hydrochloride. Then 20.6 g. of N,N′-dicyclohexyl-carbodiimide in a small amount of methylene chloride were added dropwise to this solution, while stirring. After 3 hours, the precipitate consisting of the reaction product and of N,N′-dicyclohexyl-urea was filtered off and treated with 300 cc. of dimethylformamide. The undissolved N,N′-dicyclohexyl-urea was filtered off, the filtrate was concentrated in vacuo and the residue recrystallized from acetonitrile. The 1-[N-carbobenzoxy-L(+) - α - glutaminyl]-2-isopropylhydrazine thus obtained melted at 159–160°; [α]$_D$=—16.9° (c.=1 in N hydrochloric acid).

The hydrogenolysis of 1-[N-carbobenzoxy-L(+)-α-glutaminyl]-2-isopropyl-hydrazine in water and alcohol as in Example 3 gave 1-(α-glutaminyl)-2-isopropyl-hydrazine melting at 105–107° (after recrystallization from ethyl acetate); [α]$_D$=+20.3° (c.=1 in water).

In an analogous manner and starting from 26.8 g. of N-carbobenzoxy-L(+)-asparagine, there was obtained 1-[N-carbobenzoxy-L(+)-α-asparagyl]-2-isopropyl - hydrazine, M.P. 189–191° (after recrystallization from alcohol); [α]$_D$=—13.8° (c.=1 in water) and, after hydrogenolysis, 1-[L(+)-α-asparagyl]-2-isopropyl - hydrazine, M.P. 143–145° (after recrystallization from alcohol); [α]$_D$=+10.4° (c.=1 in water); starting from N-carbobenzoxy-DL-glutamine, there was obtained 1-(N-carbobenzoxy-DL-α-glutaminyl)-2-isopropyl - hydrazine, M.P. 166–168° (after recrystallization from acetonitrile) and, after hydrogenolysis, 1-(DL-α-glutaminyl)-2-isopropyl-hydrazine, M.P. 95–97° (after recrystallization from ethyl acetate).

*Example 19*

To 2200 g. of a 41.2% aqueous solution of dimethylamine were added dropwise, within 1 hour, 306 g. of α-bromopropionic acid, while stirring at room temperature. The reaction mixture was allowed to stand for 5 days at 20–25°, whereupon it was concentrated to dryness in vacuo and the residue taken up in 7000 cc. of water. The solution thus obtained was filtered through a polystyrene nuclear sulfonic acid cation exchange column (Amerlite IR–120). The filtrate was washed with N aqueous ammonia and concentrated in vacuo. There were thus obtained 162.2 g. of DL-α-dimethylamino-propionic acid, which decomposed at 182–183° (after recrystallization from alcohol).

Dry hydrogen chloride gas was introduced into a suspension of 35.1 g. of the DL-α-dimethylamino-propionic acid thus obtained in 350 cc. of absolute alcohol until saturated. The reaction mixture was kept for 4 hours at room temperature, then concentrated to dryness in vacuo; the residual product was again taken up in 350 cc. of absolute alcohol and treated with hydrogen chloride gas until saturated. Then, the solution thus obtained was kept for 16 hours at room temperature, whereupon it was concentrated in vacuo and the residue treated with 300 cc. of ether. Ice and 60 g. of potassium hydrogen carbonate were added, the ether phase was separated and the aqueous alkaline phase extracted twice with 300 cc. of ether. The ether solutions were combined and dried by means of anhydrous potash. The ether was distilled off and the residual product distilled at 56°/12 mm. to give DL-α-dimethylamino-propionic acid ethyl ester as a practically colorless oil.

29.4 g. of the DL-α-dimethylamino-propionic acid ethyl ester thus obtained were refluxed for 8 hours with 30 cc. of methanol and 20 g. of hydrazine hydrate. The mixture was kept for 16 hours at room temperature and concentrated in vacuo to give an oily residue, which consisted mainly of DL-α-dimethylamino-propionic acid hydrazide. This residue was boiled for 30 minutes with 50 cc. of acetone, the solution was concentrated to dryness and the residue, together with 300 cc. of alcohol and 700 mg. of a platinum oxide catalyst, was shaken in a hydrogen atmosphere at room temperature until no more hydrogen was taken up. The catalyst was filtered off, the filtrate was concentrated in vacuo and 75 g. of 20% ethanolic-hydrogen chloride were added to the residue. After filtration and concentration of the mother liquors, there was obtained 1-(DL-α-dimethylamino-propionyl)-2-isopropyl-hydrazine melting at 168–170° as colorless crystals.

In an analogous manner and using α-bromo-β-hydroxy-propionic acid and an aqueous solution of dimethylamine as starting materials, there was obtained 1-(DL-α-dimethylamino - β - hydroxy - propionyl) - 2 - isopropyl-hydrazine, the monohydrochloride of which melted at 141–142°.

*Example 20*

Within 60 minutes, 306 g. of α-bromopropionic acid were added to 2000 g. of a 35% aqueous solution of methylamine, while stirring at room temperature. The reaction mixture was kept at room temperature for 5 days, then concentrated to dryness in vacuo. The residue was taken up in 1000 cc. of alcohol, again concentrated to dryness in vacuo, and the residue was dissolved in 2000 cc. of 96% alcohol under warm conditions. The residue obtained by concentrating the mother liquors was taken up in 4000 cc. of water and filtered through an Amberlite column (IR–120). The amino acid was removed from the column by washing with N aqueous ammonia. From the eluates, there was obtained DL-α-methylamino-propionic acid, which sintered at 275–282° and sublimated at 292° (after recrystallization from 95% alcohol).

30.9 g. of the DL-α-methylamino-propionic acid thus obtained were dissolved in 300 cc. of methanol and treated with hydrogen chloride gas until saturated. After concentration in vacuo, the oily residue was taken up in 100 cc. of methanol and treated with a solution of 6.9 g. of sodium in 100 cc. of methanol. The reaction mixture was separated from the sodium chloride that separated and, after addition of 20 g. of hydrazine hydrate, concentrated to 80 cc. in vacuo. The reaction mixture was kept for 30 hours at room temperature, whereupon a small amount of undissolved material was filtered off and the filtrate was concentrated to dryness. The residual oil was extracted twice with 200 cc. of boiling chloroform, the chloroform extracts were dried by means of sodium sulfate and concentrated. DL-α-methyl-amino-propionic acid hydrazide was obtained as a residue, M.P. 111.5–112.5° (after recrystallization from alcohol/ethyl acetate).

5.85 g. of this hydrazide were shaken, in a solution of 80 cc. of alcohol and 6 cc. of acetone, and in the presence of 300 mg. of platinum oxide, until no more hydrogen was taken up. On filtering off the catalyst and concentrating the residue, there was obtained a crystalline residue, which consisted of 1-(DL-α-methylamino-propionyl)-2-isopropyl-hydrazine, M.P. 134–135° (after recrystallization from benzene).

We claim:
1. A compound selected from the group consisting of those represented by the formula

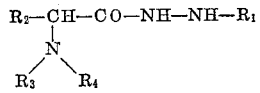

wherein $R_1$ represents a member of the group consisting of lower alkyl and phenyl lower alkyl; $R_2$ represents the radical attached to the α-carbon atom in the above characteristic α-amino acetic acid moiety of a naturally occurring α-amino acid containing up to 16 atoms, exclusive of hydrogen, $R_3$ represents a member of the group consisting of hydrogen and acetyl; and $R_4$ is hydrogen and addition salts thereof with medicinally acceptable acids.

2. A compound represented by the formula

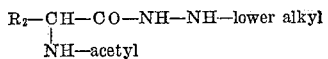

wherein $R_2$ represents the radical attached to the α-carbon atom in the above characteristic α-amino acetic acid moiety of a naturally occurring α-amino acid containing up to 16 atoms, exclusive of hydrogen.

3. A compound represented by the formula

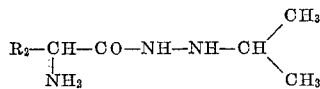

wherein $R_2$ represents the radical attached to the α-carbon atom in the characteristic α-amino acetic acid moiety of a naturally occurring α-amino acid containing up to 16 atoms, exclusive of hydrogen.

4. A compound represented by the formula

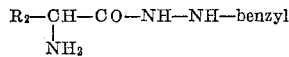

wherein $R_2$ represents the radical attached to the α-carbon atom in the characteristic α-amino acetic acid moiety of an α-amino acid.

5. 1-seryl-2-isopropyl-hydrazine.
6. 1-seryl-2-benzyl-hydrazine.
7. 1-α-glutamyl-2-isopropyl-hydrazine.
8. 1-α-glutaminyl-2-isopropyl-hydrazine.
9. 1-α-asparagyl-2-isopropyl-hydrazine.

References Cited in the file of this patent
UNITED STATES PATENTS 2,746,968    Hegedus _____ May 22, 1956

FOREIGN PATENTS 782,420    Great Britain _____ Sept. 4, 1957

OTHER REFERENCES

Ralston: Fatty Acids and Their Derivatives (1948), page 309. (Copy in Library.)

UNITED STATES PATENT OFFICE
CERTIFICATE OF CORRECTION

Patent No. 3,065,265

November 20, 1962

Hugo Gutmann et al.

It is hereby certified that error appears in the above numbered patent requiring correction and that the said Letters Patent should read as corrected below.

Column 12, line 10, after "the" insert -- above --; column 12, under the heading "OTHER REFERENCES", after line 37, add the following:

Byrkit et al. "Industrial and Eng. Chem."
Vol. 42, pages 1864-1865 (1950)

Signed and sealed this 27th day of August 1963.

(SEAL)
Attest:

ERNEST W. SWIDER
Attesting Officer

DAVID L. LADD
Commissioner of Patents